United States Patent [19]

Dodich

[11] 4,087,785
[45] May 2, 1978

[54] PORTABLE DISPLAY EQUIPMENT

[75] Inventor: Nicholas A. Dodich, Evergreen, Colo.

[73] Assignee: Over-Lowe Company, Inc., Englewood, Colo.

[21] Appl. No.: 775,166

[22] Filed: Mar. 7, 1977

[51] Int. Cl.$^2$ .................... B60Q 1/24; G08G 1/09
[52] U.S. Cl. .................... 340/114 B; 40/550;
254/139.1; 340/119; 340/41 A; 40/590
[58] Field of Search ............... 340/41 A, 114 B, 109, 340/119, 82; 280/491 B, 415; 254/139.1, 148, 175.7; 248/188.2, 329; 296/3, 21; 52/121; 40/129 R, 129 C

[56] References Cited

U.S. PATENT DOCUMENTS

| 3,305,219 | 2/1967 | Rhodes | 254/139.1 |
|---|---|---|---|
| 3,450,386 | 6/1969 | Eliel | 254/139.1 |
| 3,495,364 | 2/1970 | Debella | 52/121 |
| 3,622,980 | 11/1971 | Elledge, Jr. | 340/82 |
| 3,702,033 | 11/1972 | Coleman | 40/129 R |
| 3,798,814 | 3/1974 | Harmon | 40/129 R |
| 3,883,846 | 5/1975 | Bruner | 340/109 |

Primary Examiner—Donald J. Yusko
Attorney, Agent, or Firm—Wm. Griffith Edwards

[57] ABSTRACT

A portable electric sign display unit comprises a wheeled trailer having a main frame on which is mounted a motor-generator unit and a structure for holding a warning sign or the like in an elevated position. The sign carrying structure is collapsible into a position in which a central portion of the sign panel forms a roof over the motor-generator unit and two hinged side panels form the sides of the cover for the unit. The sign is erected by operation of a winch which first rotates the sign panel toward its vertical position and then raises the structure a further distance to the fully elevated position. The side panels are locked into position in the same plane as the central portion and electric lights forming the display are mounted on all three portions.

10 Claims, 15 Drawing Figures

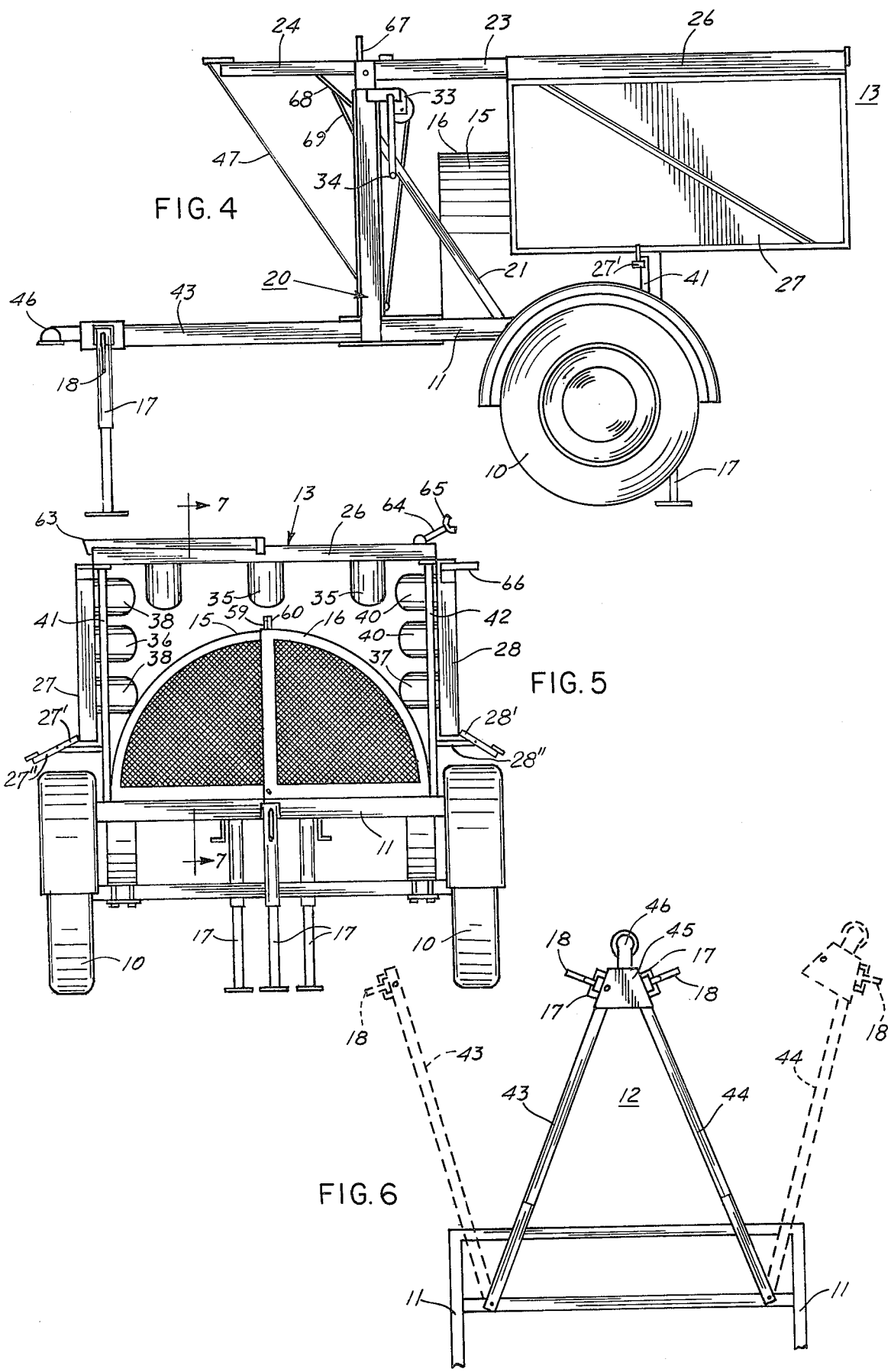

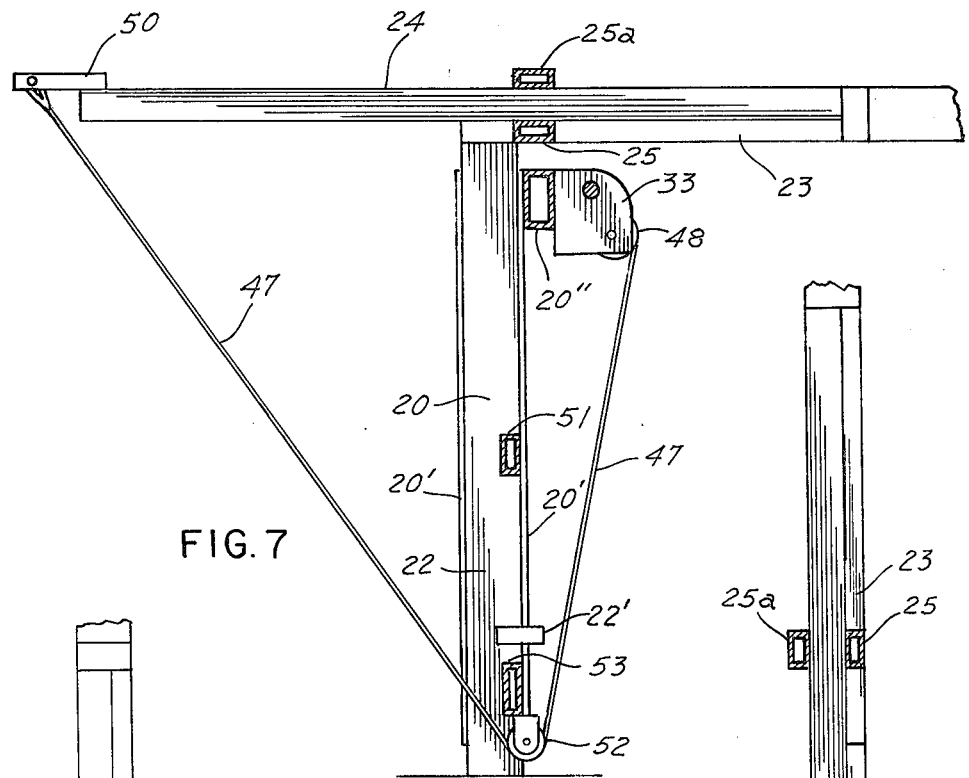
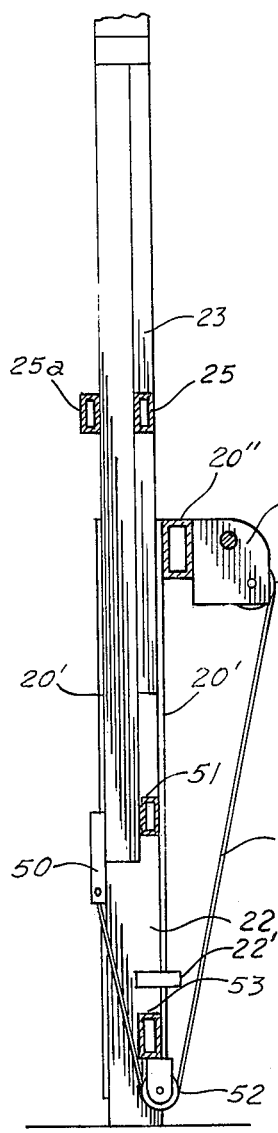
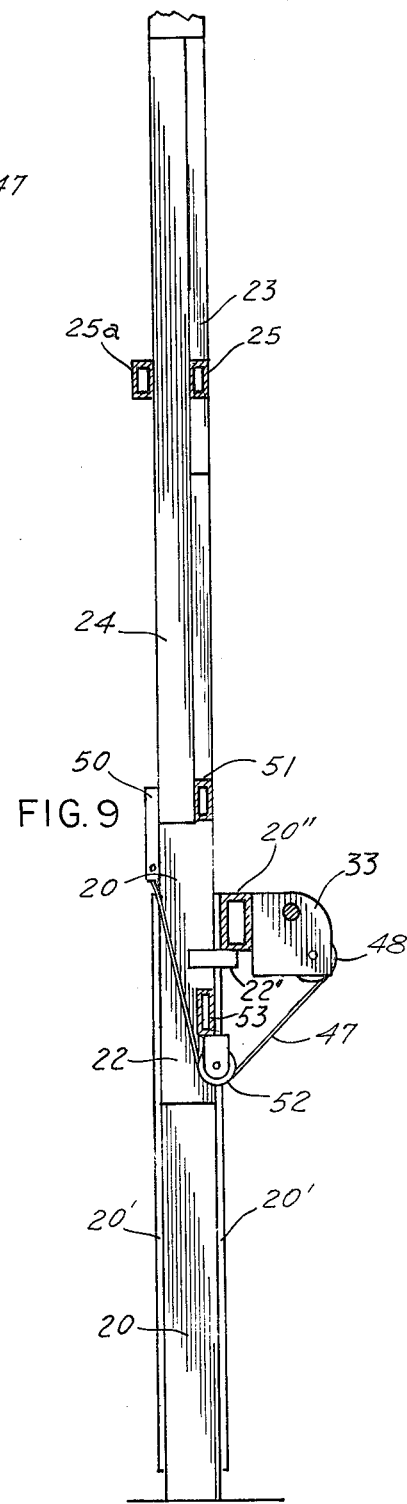
FIG. 7
FIG. 8
FIG. 9

PORTABLE DISPLAY EQUIPMENT

This invention relates to portable equipment for providing electrical displays such as warning or direction signs for traffic in a temporary or emergency location, and particularly to an improved arrangement for vehicular trailer equipment for carrying electrical traffic directing signs.

One form of equipment which has come into frequent use is an electric sign having thereon an arrow formed by lamps and arranged so that the arrow may be lighted for either a right-hand or left-hand direction indication. It is desirable that these equipments be readily portable and for this reason they may be mounted on trailers which may be towed by a truck or automobile. It is desirable that the structure of the display equipment not interfere with traffic and that it be easily erected as desired in any position for directing traffic. Accordingly, it is an object of my invention to provide an improved arrangement of a portable display carrier including an improved construction of the display support and an arrangement whereby the arrangement may be collapsed or folded to reduce its overall size for transportation and storage purposes.

It is another object of my invention to provide an improved display carrier which may be easily and quickly erected for emergency purposes and may be quickly and readily taken down for removal.

It is another object of my invention to provide a readily portable display carrier for traffic direction signs and the like which may be folded into a compact configuration with a low center of gravity for transportation and may readily and quickly be erected by a single operator.

Briefly, in carrying out the objects of my invention in one embodiment thereof, I provide a trailer structure for carrying a display sign such as a traffic direction sign lighted electrically. The sign is carried on a supporting structure which includes a rigid support on the carrier or trailer, a sliding support mounted in the rigid support and a foldable support for carrying the sign. The trailer body is provided with a gasoline or diesel motor driven electric generator to supply energy for the lights. The light panel may be lowered within the rigid structure and then rotated about a horizontal axis into position over the body of the trailer which may contain the motor-generator unit and the end walls of the sign may be folded down so that the sign forms a cover for the trailer body which also provides protection for the lights. A single actuator comprising a winch is provided for first rotating the sign display panel from its horizontal position and then on continuing operation of the winch raising the sign in its upright position to the full height of the structure. The sign can thus be taken to a location of a blockade or emergency detour, for example, erected quickly, and maintained in operation until it has served its purpose, whereupon it may be collapsed and towed away for other use.

The features of novelty which characterize my invention are pointed out with particularity in the claims annexed to and forming a part of this specification. My invention itself, however, both as to its organization and manner of operation, together with further objects and advantages thereof, will best be understood upon reference to the following description taken in connection with the accompanying drawings in which:

FIG. 4 is a left-hand side elevation view of the trailer with the panel supporting structure in collapsed position for transportation;

FIG. 5 is a rear end view of the trailer in the position shown in FIG. 4 with the upright structure support omitted;

FIG. 6 is a somewhat diagrammatic view of the towing tongue structure of the trailer;

FIG. 7 is an enlarged partial sectional view taken along the line 7—7 of FIG. 5;

FIG. 8 is a view similar to FIG. 7 showing an intermediate position of the structure;

FIG. 9 is a view similar to FIG. 7 showing the erected structure;

Figure 1:
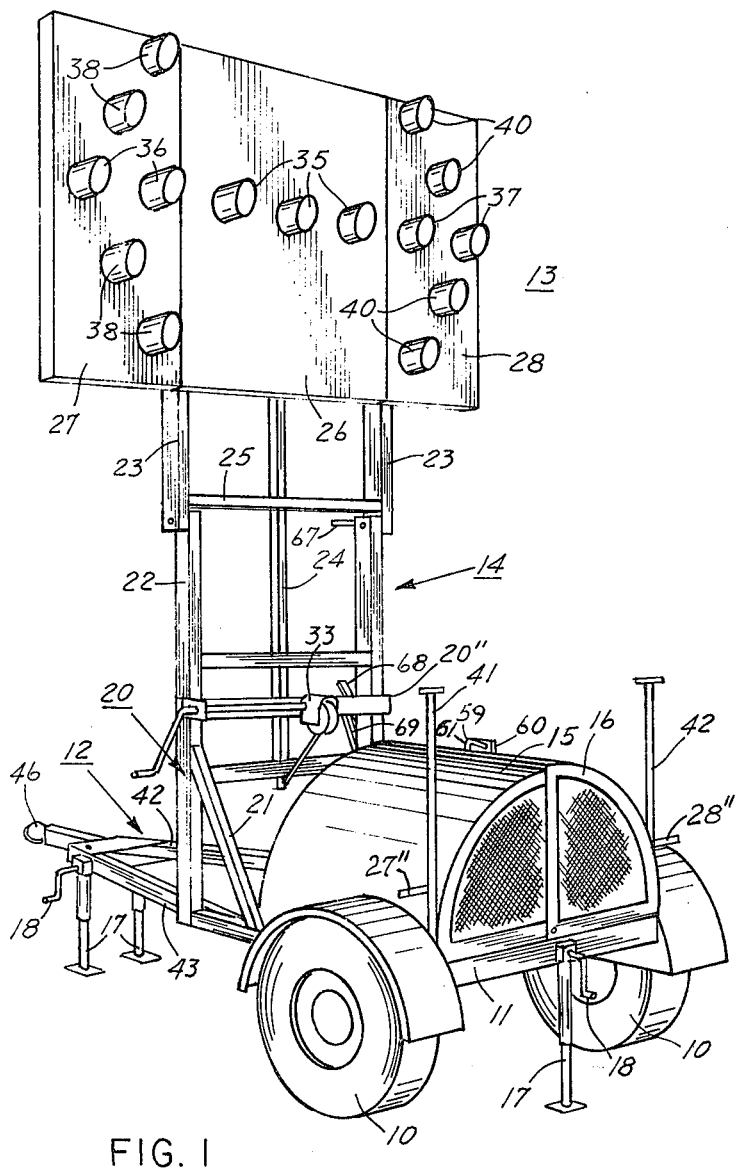
FIG. 1 is a perspective view of a portable trailer equipment embodying my invention.

Referring now to the drawings, FIG. 1 shows in perspective a portable display equipment comprising a two-wheeled trailer having wheels 10 carrying a base or main frame 11 having a tongue 12 for attachment to a truck or other vehicle for towing. An electric display panel 13 is mounted on a frame structure 14 which extends upwardly from the frame 11 to which it is rigidly attached. The panel has been illustrated as of the traffic directing type, which when lighted shows an arrow pointing either to the right or to the left selectively as desired. A gasoline motor-generator unit (not shown) is mounted on the frame 11 within a housing comprising cylindrical quarter-section hoods 15 and 16, the section 15 being rotatable on its central axis to slide within the hood 16 and thereby provide open access to the generator unit.

The display equipment of FIG. 1 is illustrated as in its position for use wherein the tongue 12 is supported from the ground by two jacks 17 and a third jack 17 is provided at the rear of the frame where it engages the ground. The jacks are provided with operating handles 18 for adjustment and further may be rotated out of position for transportation so that they lie along the frame members. The frame structure 14 comprises a rectangular base frame 20 which is welded or otherwise rigidly attached to the frame 11 and has a diagonal supporting brace 21 for increasing the rigidity of the support. A second rectangular frame member 22 is slidably mounted in the frame 21 for vertical movement with respect thereto and has vertical support members 23 of the panel 13 pivoted to it at its top end. The pivoted frame members 23 are locked in their vertical positions as shown in FIG. 1 in a manner to be described below. The frame of the panel 13 has a central bar or frame member 24 which extends below the supports 23 and is attached to the front and rear bottom crossbars of the frame of the panel, the rear crossbar being indicated at 25 in FIG. 1 and the front crossbar at 25a in FIG. 2.

The panel 13 comprises a central section 26 which is formed by sheet metal walls securely mounted on the frame members 23 to provide a box-like structure, and side panels 27 and 28 similarly constructed and which are hinged to the panel 26 so that they may be folded for purposes of transportation in a manner to be described below.

Figure 2:
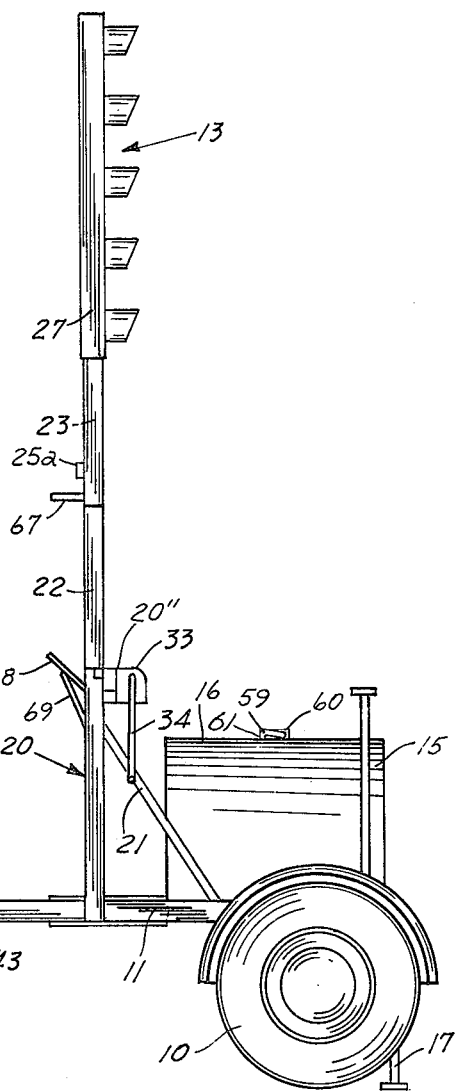
FIG. 2 is a left-hand side elevation view of the trailer of FIG. 1.
Figure 3:
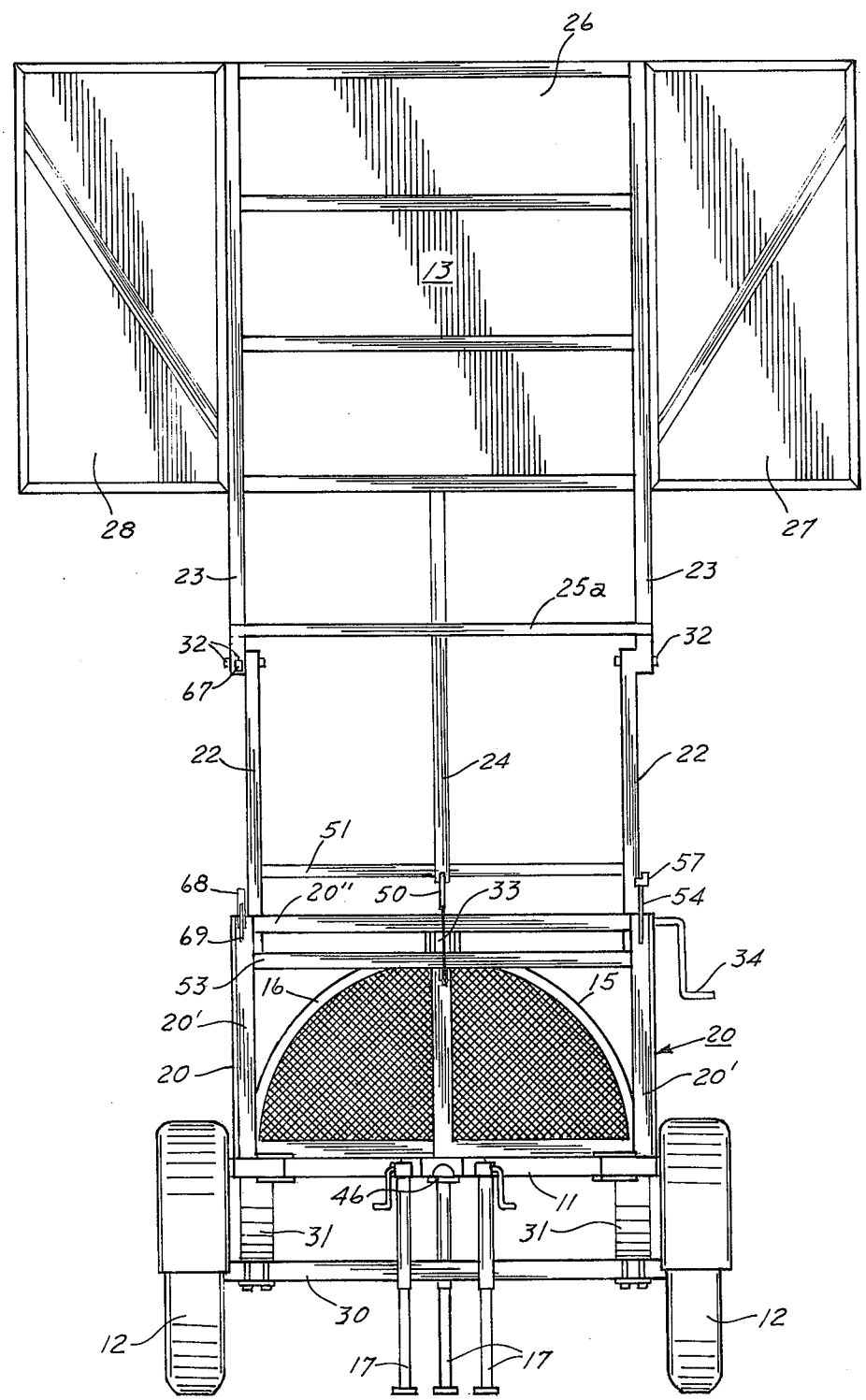
FIG. 3 is a front elevation view of the trailer with the display panel erected.

The construction of the supporting structure 14 is shown in FIGS. 1, 2 and 3. In FIG. 3 the rear sides of the light panels are shown with the sheet covering removed to show the frame structure. As shown in FIG. 1, the wheels 12 are mounted on an axle 30 which supports the frame 11 on springs 31. The uprights 20 which are rigidly secured to the frame 11 are provided with side plates which extend inwardly from both sides of the uprights and provide a channel in which the frame members 22 of the vertically movable support are slidable. The panel 13 is pivoted to the upper ends of the frame members 22 by pins 32 which connect the ends of the frame members 22 and 23. The raising and lowering of the frame structure is effected by operation of a geared winch 33 which is mounted at the center of the upper cross member of the frame 20 indicated at 20"; this winch is operated by turning a crank 34. The winch is of the type which includes an automatic brake such that the handle may be turned to any position so that upon stopping the winch will remain in position and hold the cable securely. An electric motor drive (not shown) may be provided for the winch to facilitate the raising and lowering of the frame structure.

As shown in FIG. 1, the lights forming the directional arrows comprise a row of three lights on the panel 26 as indicated at 35 and groups of six lights on each of the panels 27 and 28 which include two pairs of lights shown at 36 and 37 on the panels 27 and 28, respectively, and diagonal lights 38 on the panel 27 which form an arrow pointing to the left and diagonal lights 40 on the panel 28 which form an arrow pointing to the right. The central lights 35, 36 and 37 form a straight line of seven lights; in the usual light pattern six of these seven lights are lighted during the use of the display. The direction of the arrow is determined by lighting either the lights 38 for a left-hand arrow or the lights 40 for a right-hand arrow, the inside light 36 or 37 is not lighted when the respective arrow lights 38 or 40 are lighted; this provides a more distinctive arrow when viewed from a distance. Suitable manual controls are provided for selecting the arrow to be energized.

The panel 13 and its supporting structure may be collapsed and arranged over the housing sections 15 and 16, so that the trailer appears as shown in FIGS. 4 and 5. Here the panel 26 is shown as a horizontal cover over the trailer body and the panels 27 and 28 form the sides of the enclosure. In this position the panel 13 rests on its pivotal supports and on left and right hand upright posts 41 and 42, respectively, and the side panels 27 and 28 are held in their folded positions by pivoted latches 27' and 28', respectively, these latches being mounted on posts 27" and 28" secured to the upright posts. The tongue assembly 12 of the trailer as shown in FIG. 6 comprises left-hand and right-hand members 43 and 44, which are brought together at the front end in a fitting 45 which secures them and serves as the support for a trailer hitch 46. When in travelling position, the jacks 17 are folded along the members 43 and 44. When the trailer is to be positioned for use the arms 43 and 44 may be swung outwardly as indicated by the dotted line positions in FIG. 6 so that the respective jacks are positioned outside the area of the supporting frame and provide a stabilized footing arrangement in cooperation with the central jack 17 at the rear of the vehicle.

The motor-generator unit may be locked by locking the cylindrical hood sections together when in their closed positions. A lock member 59 is pivoted on plate 60 securely attached to the section 16 and has a tongue 61 which may be inserted in a slot (not shown) in the edge of the section 15. When the tongue is in the slot a hole 60' in the plate 60 is in register with a hole 61' in the tongue, and the shackle of a padlock may be passed through these holes to secure the sections 15 and 16 and prevent opening of the cover.

The panel as illustrated is arranged to be collapsed as described above and locks are provided for holding it in its open position as shown in FIG. 1. These locks are indicated in FIG. 5 one comprising a spring bar 63 which is in position to be engaged by a catch (not shown) on the panel section 27 when it is raised into position in alignment with the panel 26 and the other which is a pivotally mounted threaded member 64 having a wingnut 65 arranged to engage a bifurcated lug 66 on the panel 28. In the illustration these members are, of course, in their detached position since the panel 28 is in its collapsed or vertical position.

The manner in which the panel supporting structure is raised from its position of FIG. 4 to that of FIGS. 1, 2 and 3 is indicated in FIGS. 7, 8 and 9. FIG. 7 illustrates the panel supporting structure positioned as shown in FIG. 4. In this position the extension 24 of the panel frame extends forwardly of the structure 20 and a cable 47 extends from the reel 48 of the winch 33 to an offset block 50 at the end of the arm 24. When the winch is operated, the cable 47 draws the arm downwardly rotating it about the pivot point of the panel structure until it strikes a crossbar 51. The cable 47 passes over a pulley 52 at the bottom of the movable structure crossarm 53 and when the structural frame members 23 approach their upright position a catch, described below, is released and the cable begins to lift the movable structure which slides upwardly in the channel formed by plates 20' on the sides of the upright 20. The cable continues to lift the sliding structure until it reaches the position indicated in FIG. 9 where stops 22' on the frame members 22 strike the upper crossbar 20" of the frame 20 which determines the position for the panel. The rotation of the panel structure followed by linear upward movement provides a simple and effective arrangement for erecting the panel positively and quickly and for locking it in place, the brakes of the winch 33 serving to hold the cable 47 against further movement until the handle 34 is again turned.

Figure 10:
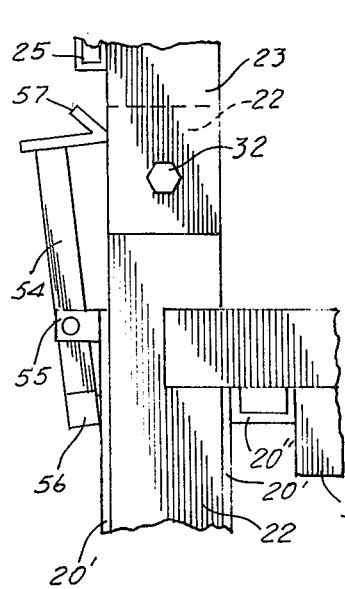
FIGS. 10, 11 and 12 are enlarged detail views of a portion of the structure of FIG. 1.
Figure 11:
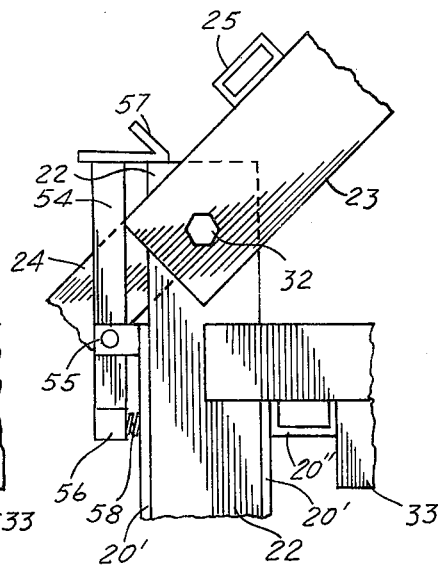
Figure 12:
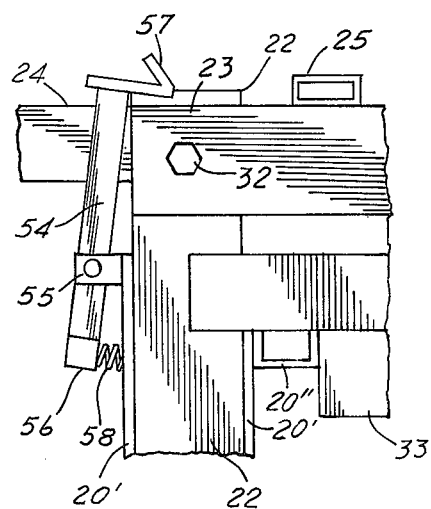

The catch for preventing the lifting of the pivoted panel frame until it has reached its upright position is illustrated in FIGS. 10, 11 and 12. The catch comprises a bar 54 pivoted in a bracket 55 rigidly attached to the channel frame 20'. The bar is provided with a catch or engaging element 57 which is biased toward its latching position by a coiled spring 58 mounted between the frame member 20' and a spring retainer 56 at the lower end of the bar.

Figure 11A:
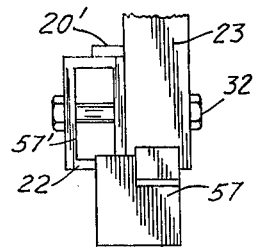
FIG. 11a is a top plan view of a part of the device in the position of FIG. 11.

In FIG. 10 the bar 54 is shown in its retracted position where it is held by the engagement of the right-hand tip of the catch 57 with the front surface of the frame member 23. In FIG. 11 the frame member 23 is at about 45° to the vertical and an offset portion 57' of the catch 57 is in engagement with the top surface of the member 22, the offset being shown in FIG. 11a. In FIG. 12 the frame 23 has moved to its horizontal position and the catch portion 57' has moved farther over the top of the frame 22 and remains in position to prevent upward movement of the structure. These three positions are reached in reverse order when the panel frame 23 is rotated upwardly by the winch 33 and the frame 22 is prevented from rising until the offset catch 57' has been moved away from the top of the frame 22; the catch is released before the frame reaches its vertical position by engagement of the tip or right-hand end of the catch 57 with the rotating frame member so that the frame 23 as it approaches its vertical position can move upwardly and to the position of FIG. 10 and then farther upward to its top position.

Figure 13:
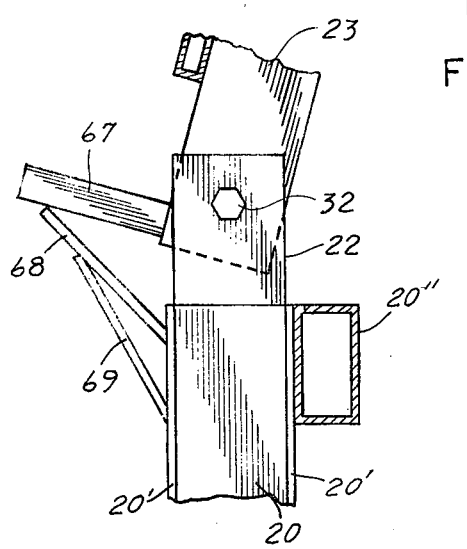
FIGS. 13 and 14 are enlarged views similar to FIGS. 10, 11 and 12 illustrating a further detail of the structure of the invention.
Figure 14:
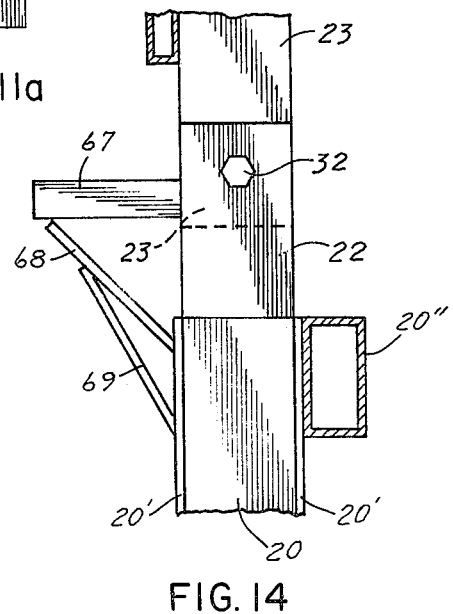

When the winch 33 is operated to lower the panel 13 from its position as shown in FIGS. 1 and 2, the panel 13 and its supporting structure 23 are turned in a clockwise direction by engagement of a short post 67 rigidly attached to the member 23 adjacent the pivot 32. This is effected when, as indicated in FIG. 14, the post 67 engages in abutment 68 rigidly secured to the post 20 and then the frame turns as indicated in FIG. 13. The abutment 68 is reinforced by a diagonal strap 69 which is also rigidly secured to the plate 20' of the structure 20 and also to the abutment 68. As the structure 23 turns the bar 24 moves outwardly away from the post 20 under control of the cable 47 under the tension provided by the winch 33. And the winch controls the lowering of the rotatable portion of the panel support structure. The position of FIGS. 13 and 14 are reached in order when the bar 67 is moved upwardly during the initial lifting of the frame member 22.

Applicant's invention as illustrated and described above provides an easily transportable emergency sign for use on highways and the like for indicating barricades or emergency turns and provides an arrangement which may easily be erected at the selected sight without requiring additional tools and further which may be performed by a single operator controlling the winch 33.

While the invention has been described in connection with specific details of its construction, various modifications and other applications will occur to those skilled in the art. Therefore, it is not desired that my invention be limited to the specific details illustrated and described and it is intended by the appended claims to cover all modifications which fall within the spirit and the scope of the invention.

I claim:

1. A portable display apparatus comprising a supporting structure of the wheeled trailer type, an upright support rigidly secured on said structure, a movable support member mounted on said upright support for up and down movement with respect thereto, a display carrying support pivotally mounted near the top of said movable support member for swinging movement between a horizontal position and a vertical position, means for successively rotating said display carrying support to an upright position in alignment with said upright support and then raising said movable support member to an elevated position above said supporting structure.

2. A portable display apparatus as set forth in claim 1 wherein said movable support member is of rectangular configuration and said upright support includes guides for constraining said movable member to linear movement.

3. A portable display apparatus as set forth in claim 1 wherein said means for rotating said display carrying support includes an elongated member extending normal to the axis of rotation on the side of the pivot remote from the display carrying portion thereof and wherein said rotating means includes a winch secured to said upright support and having a cable attached to the outer end of said elongated member and engaging a pulley adjacent the bottom of said movable member.

4. A portable display apparatus as set forth in claim 3 wherein said winch is near the upper end of said upright support and wherein said cable draws said elongated member against the movable support at the bottom thereof and then lifts the movable support upwardly along said upright support.

5. A portable display apparatus as set forth in claim 1 including stop means near the top of said upright structure and a projection near the lower end of said display support and extending horizontally and engaging said stop upon lowering of said display structure for tilting said structure to initiate the rotation thereof upon lowering of the display structure.

6. A portable display apparatus as set forth in claim 1 wherein said trailer includes a main frame, a motor-generator unit mounted on said frame and electric lights on said display carrying support supplied by said generator, and wherein said lights are mounted on a central panel and two side panels hinged thereto, said panels forming a single panel in the erected position of said structure and said central panel in the lowered position of said structure constituting a cover for said motor-generator unit and said hinged panels being rotatable to positions at right angles to the central panel and providing side covers for said unit and protecting said lights.

7. A portable display apparatus as set forth in claim 6 including means for locking said panels in their folded position for preventing vertical movement of said display carrying support and said movable support member during transportation of said apparatus.

8. A portable display apparatus as set forth in claim 7 wherein said locking means is actuated by rotation of said display carrying support.

9. A portable display apparatus as set forth in claim 6 including a pair of cylindrical cover members for enclosing said motor-generator unit at least one of said cover members being rotatable about the axis of said cover to a position of coincidence with the other for affording access to said unit, and means for locking said cover members together in their covering positions for preventing access to said unit.

10. A portable display apparatus as set forth in claim 1 including means for preventing the raising of said movable support member until said display carrying support approaches its vertical position.

* * * * *